Dec. 23, 1969     F. S. MILLEN     3,485,969
VEHICLE IGNITION SWITCH
Filed June 19, 1968
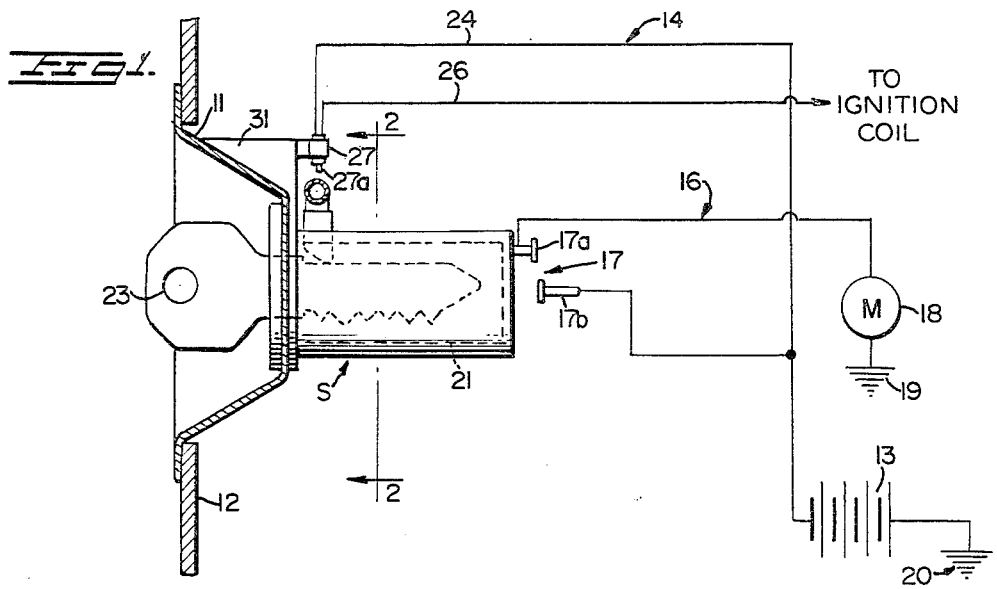
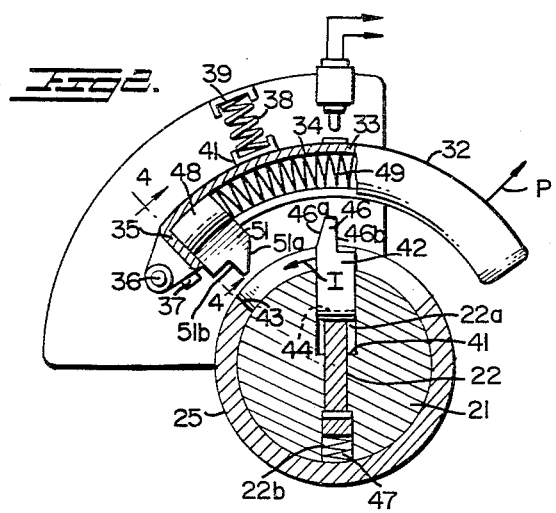
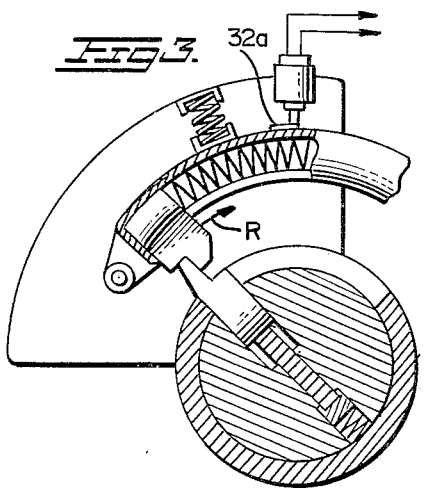
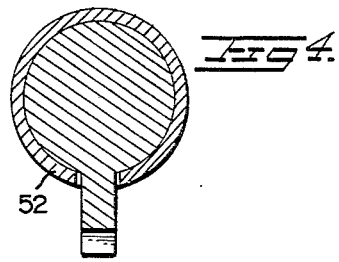
INVENTOR
FRED S. MILLEN
T. Russell Foster
ATTORNEY United States Patent Office 3,485,969
Patented Dec. 23, 1969

1

3,485,969
VEHICLE IGNITION SWITCH
Fred S. Millen, 1101 Dogwood Lane,
Hartsville, S.C. 29550
Filed June 19, 1968, Ser. No. 738,293
Int. Cl. H01h 9/28, 27/00; E05b 17/00
U.S. Cl. 200—44                                  6 Claims

ABSTRACT OF THE DISCLOSURE

A key operated vehicle ignition switch including a lock cylinder mounted for rotation by a key insertable therein to a starting position and having a tab member mounted thereon radially movable to an extended position for engagement with means slidably mounted on a pivotally movable actuating member in the starting position of the cylinder to move the actuating member into closing engagement with a normally open switch in the ignition circuit and to maintain the actuating member in the switch closing position until the key is withdrawn from the lock cylinder.

---

This invention relates to a vehicle switch and more particularly to a key operated vehicle ignition switch which maintains the vehicle motor in operation until the key is withdrawn from the switch.

A common type of switch utilized today in the operation of motor driven vehicles such as automobiles is a switch generally referred to as a "lock switch" in which the proper key must be inserted into a lock cylinder for rotation of the cylinder to a motor starting position. It is well known that the use of automobiles by unauthorized persons and in particular thieves is widespread and is rapidly becoming a serious crime problem.

While the requirement that the proper key be used in such ignition switches serves as a deterrent to such unauthorized use, the typical automobile owner frequently through inadvertence or carelessness fails to remove the key from the switch after operation of the vehicle not only greatly facilitating the misappropriation and use of the vehicle but freqeuntly serving to tempt such un· authorized persons, who would not otherwise do so, to steal the automobile. In order to warn the autombile wner who, subsequent to the vehicle operation, has failed to remove the key from the ignition switch, various devices have been proposed to signal the owner. Such present day devices generally employ visual or audible means such as a light, a door operated buzzer, etc. Although such warning devices generally accomplish the desired purpose, such present-day devices are expensive and complicated in construction and generally require considerable modification to ignition switches of the type in common use today.

Accordingly, a primary object of this invention is to provide a new and novel switch for signaling a vehicle owner that the ignition key has not been removed from the switch.

Another object of this invention is to provide a new and novel key operated ignition switch which utilizes the vehicle motor as a warning signal to the owner who fails to remove the ignition key from the switch.

Still another object of this invention is to provide a

2 new and novel key operated ignition switch for a vehicle such as an automobile which maintains the vehicle motor in operation until the key is removed.

This invention further contemplates the provision of a key operated ignition switch for a motor driven vehicle such as an automobile which is simple and inexpensive in construction, which may be readily adapted to present day vehicle ignition and starting systems and which utilizes the best available signal for the vehicle operator who typically will not depart the vehicle with the motor running.

A still further object of this invention is to provide a new and novel key operated ignition switch which provides an audible warning for the vehicle operator whose key remains in the ignition after use of the vehicle which the operator can be interrupted only by removal of the key.

Other objects and advantages of the invention will become apparent from the following description taken in connection with the accompanying drawing.

The objects of this invention and other related objects are accomplished by the provision of a key operated ignition switch for a vehicle of the type which includes an ignition circuit, a starter motor circuit, a source of electrical power, and a rotatably mounted lock cylinder having a key slot for accommodating an ignition key through which the cylinder is moved rotatably from an inoperative position to a s'arting position for connecting a source of electrical power to the starter motor circuit. The ignition circuit includes a normally open switch means movable from a normally open to a normally closed position by movably mounted actuating means maintained normally in an inoperative position. The actuating means is moved into the operative position by a tab member supported on the cylinder for reciprocating radial movement between a retracted and an extended position and which is moved into the extended position by the key inserted into the cylinder key slot. In the starting position of the cylinder, the extended tab member engages connecting means movably mounted on the actuating means for moving the actuating means in the operative position and as the cylinder moves from the starting position back to the inoperative position, the extended tab member is maintained in engagement with the connecting means to maintain the actuating means in the operative position thereby maintaining the ignition circuit switch means in the closed position until the key is withdrawn from the key slot and the actuating means permitted to return to the inoperative position.

The novel features which are believed to be characteristic of the invention are set forth with particularity with the appended claims. The invention itself, however, both as to its organization and method of operation may be best understood by reference to the following description taken in conjunction with the accompanying drawing in which:

FIGURE 1 is a side view of the switch of the invention together with a wiring diagram of the associated circuitry;

FIGURE 2 is a sectional view taken substantially along line 2—2 of FIGURE 1 in the direction of the arrows;

FIGURE 3 is a sectional view similar to FIGURE 2 showing the parts in another operating position; and FIGURE 4 is an enlarged sectional view taken substantially along line 4—4 of FIGURE 2.

As generally illustrative of the invention and referring now to FIGURE 1, the switch of the invention, designated generally by the letter S, is suitably mounted on support means such as a cup shaped member 11 suitably secured on a panel 12. The switch S is particularly adapted for use as an ignition switch for a vehicle which may be motor driven such as an automobile arranged to be driven by a motor started in the well-known manner with an electrically operated started motor.

As is well known, the switch S is associated with a source of electric power such as a battery 13 and an ignition circuit, designated generally by the numeral 14, is connected in the well-known manner to an ignition coil (not shown) and to one side of the battery 13. Also associated with the switch S is a starter motor circuit, designated generally by the numeral 16, which includes a switch 17 preferably in the form of a pair of contacts 17a, 17b, a starter motor 18, one side of which is grounded at 19, and arranged for connection to the battery 13, one side of which is suitably grounded at 20 in the well-known manner.

The switch S includes the well-known type of lock cylinder 21 having a key slot 22 as shown best in FIGURE 2. The cylinder 21 is rotatably mounted within a tubular sleeve 25 suitably positioned on the support means or cup shaped member 12 for rotation by a key 23 inserted in the key slot 22 between an inoperative position as shown in FIGURES 1, 2 with the starter motor circuit switch 17 in the open position and an operative position of FIGURE 3 in which the starter switch 17 is closed by engagement of the contacts 17a, 17b to connect the motor 18 to the battery 13 for energizing the starter motor 18 for starting the motor by which the vehicle automobile is operated.

As specifically illustrative of the invention, the ignition circuit 14 which, as is conventional, includes a conductor 24 connected to the ungrounded side of the battery 13 and a second conductor 26 connected to an ignition coil (not shown) is provided with normally open switch means 27 for connecting the ignition circuit 14 to the source of power or battery 13. As shown best in FIGURE 1, the switch means 27, which may be of any well-known type suitably connected to the conductors 24, 26, is provided with a plunger 27a normally urged outward to interrupt the connection between the conductors 24, 26 and disconnect the ignition circuit 14 from the source of power 13. Movement of the plunger 27a inwardly bridges the conductors 24, 26 to connect the ignition circuit to the source of power 13. The switch 27 is preferably mounted in any suitable manner adjacent the switch S such as by means of a plate 31 suitably supported on the support means formed by the panel 11 and member 12.

Actuating means are mounted on the support means for movement between an inoperative position and an operative position for closing the normally open switch means 27 and thereby connecting the source of electrical power 13 to the ignition circuit 14. More specifically, the actuating means includes an arcuately shaped tubular member 32 having a body wall 33 defining a central bore 34 and an end wall 35. The actuating member 32 is pivotally mounted at one end by suitable means such as a pivot pin 36 suitably secured to the plate 31. The actuating member 32 is normally urged into the inoperative position of FIGURE 2 against a stop member 37 on the plate 31 by suitable means such as a coil spring 38 the ends of which are received within sockets 39, 41 mounted on the plate 31 and tubular member 32 respectively.

The actuating member 32 is arranged to move between the inoperative position of FIGURE 2 and the operative position of FIGURE 3 against the urging force of the spring 38 to depress the plunger 27a of switch 27 and therefore close the switch 27. It should be understood that although spring 38 is provided for urging the actuating member 32 into the inoperative position of FIGURE 2, any other suitable urging means may be employed such as by the use of gravity which permits the member 32 to fall of its own weight against the stop member 37.

In order to move the actuating member 32, the key slot 22 of the lock cylinder 21 is provided with an enlarged portion 22a forming a shoulder 41. A tab member 42 is positioned within the slot portion 22a for reciprocating radial movement between a retracted position with the tab member fully withdrawn into the slot portion 22a when the key 23 is withdrawn from the slot 22 and an extended position as shown in FIGURES 2, 3 when the key 23 is positioned in the slot 22 as shown in FIGURE 1.

The lock cylinder sleeve 25 is preferably cut away at 43 to provide an arcuate opening to accommodate the extended tab member 42 as it moves from the inoperative position of FIGURE 2 into the starting position of FIGURE 3, the lock cylinder 21 being urged in the well-known manner by suitable means such as a spring (not shown) into the inoperative position of FIGURE 2. Also, it should be understood that the lock cylinder 21 may be moved to the right as viewed in FIGURE 2 from the position shown to actuate suitable switches for operation of the accessories normally provided on a vehicle such as an automobile.

The tab member 42 has an inner end 44 and an outer end 46 which is provided with a camming surface 46a and a notch 46b. Suitable urging means such as a spring 47 is positioned within a second enlarged portion 22b of the slot 22 for yieldingly maintaining the tab member 42 in the extended position of FIGURE 2 when the key 23 is inserted within the cylinder slot 22.

Movement of the actuating means by the tab member 42 is accomplished through the provision of connecting means movably mounted on the actuating means which is normally urged into a stop position on the actuating means adjacent the tab member 42 in the starting position of the lock cylinder 21 as shown in FIGURE 3. More specifically, a slide member 48 is slidably positioned within the bore 34 of the actuating memebr 32 and is normally urged by means such as a coil spring 49 also positioned within the bore 34 into a stop position against the actuating member end wall 35.

The slide member 48 which preferably is of generally cylindrical shape is provided with an extension 51 which protrudes through a longitudinal slot 52 in the actuating member body wall 33 as shown best in FIGURE 4 for sliding movement therein so that the extension 51 is disposed between the actuating member 32 and the lock cylinder 21. It should be understood that although, in the preferred embodiment, a coil spring 49 is provided for urging the slide member 48 into the stop position of FIGURE 2, other means for moving the slide member 48 to the stop position may be employed such as by the use of gravity or the like.

The slide member extension 51 is provided with a cam surface 51a and a notch 51b which are sequentially engageable by the tab member cam surface 46a and shoulder 46b for camming the actuating member 32 into the operative position of FIGURE 3 and for moving the slide member 48 slidably along the actuating member 32 respectively.

In order to operate the vehicle such as an automobile with which the switch S is associated, the proper key 23 is inserted into the cylinder slot 22 so that the key 23 moves the tab member 42 radially outward into the position of FIGURES 1, 2, the other parts shown in FIGURES 1, 2 being at this time in the position shown. With the key in the position of FIGURES 1, 2, the contacts 17a, 17b are spaced apart to open the switch 17 and switch 27 in the ignition circuit 14 is open thereby disconnecting the battery 13 from both the ignition coil and the starter motor 18 by means of which the vehicle motor is cranked.

The key 23 is then turned by the operator in the well-known manner to the left as viewed in FIGURE 2 whereby the lock cylinder 21 is rotated in the direction of the arrow I of FIGURE 2 in the tubular sleeve 25 against the conventional urging means (not shown) which acts to normally maintain the cylinder 21 in the position of FIGURE 2.

As the extended tab 42 is rotated, the cam surface 46a on the tab member forward end 46 engages the cam surface 51a on the slide member extension 51 to cam the slide member radially outward relative to the cylinder 21 and pivot the actuating member 32 against the urging force of the coil spring 38 in the direction of the arrow P so as to move the actuating member 32 from the inoperative position of FIGURE 2 into the operative position of FIGURE 3 whereupon the actuating member 32 engages the plunger 27a of switch 27 connecting conductors 24, 26 together and connecting the ignition coil to the battery 13.

Immediately following the closing of switch 27 as the cylinder 21 is rotated, the starter switch contacts 17a, 17b are brought together to connect the battery 13 to the starter motor 18 whereby operation of the vehicle motor is initiated. As the camming surfaces 51a, 46a slide relative to each other, the forward end 46 of the tab member 42, the notches 46b and 51b on the tab member 42, and slide member extension 51 respectively interengage. It will be noted that the spring 22b exerts sufficient force on the tab member 42 to yieldingly maintain the actuating member 32 in depressing engagement with the switch plunger 27a during the engagement of the tab member 42 with the slide member extension 51.

As the vehicle motor is now started and in operation, the operator then releases the key 23 in the normal manner and the cylinder 21 returns under its urging means to the inoperative position of 21 as shown in FIGURE 2 but with the tab member 42 and slide member 48 in engagement. The slide member 48 is therefore carried to the right in the direction of the arrow R of FIGURE 3 against the urging force of the spring 49 while maintaining the actuating member 32 in depressing engagement with the switch plunger 27a. Thus, the ignition circuit 14 is continuously connected to the battery 13 and the vehicle motor may not be turned off without withdrawal of the key 23 from the key slot 22 in the cylinder 21.

In order to interrupt the ignition circuit and turn off the vehicle motor, the key 23 must be withdrawn from the key slot 22 whereupon the tab member 42 is no longer supported and moves into a retracted position in the key slot enlarged portion 22a with its rear end 44 engaging the shoulder 41. This movement of the tab member 42 releases the slide member 48 permitting it to be returned to the stop position of FIGURE 2 by the coil spring 49 and permitting the actuating member 32 to be moved to the inoperative position by the coil spring 38.

It can be seen that there has been provided with the novel construction of this invention a key operated ignition switch for a vehicle and in particular for an automobile which is simple and inexpensive in construction and which may be easily incorporated in present day vehicles in association with components presently installed on conventional vehicles with virtually no modification. The need for a warning to motorists who fail to remove the ignition key subsequent to vehicle use which is now being widely pressed both by choice and by law and this need may now be satisfied without the provision of additional audible or visual signaling means since the continued operation of the vehicle motor itself serves as a warning which the majority of motorists are reluctant to ignore when departing from the vehicle. The switch of the invention may be operated in a conventional manner and is virtually foolproof in operation being capable of prolonged use without breakdown due to the novel arrangement of the parts.

While there has been provided what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. A key operated ignition switch for a vehicle including support means, an ignition circuit, a starter motor circuit including a switch, a source of electrical power arranged to be connected to said ignition and starter motor circuits, and a lock cylinder having a key slot rotatably mounted on said support means for rotation by a key inserted in said key slot between an inoperative position and a starting position for opening and closing said starter motor circuit switch respectively, the improvement which comprises, normally open switch means in said ignition circuit for connecting said ignition circuit to said source of power, actuating means mounted on said support means for movement between an inoperative position and an operative position for closing said normally open switch means to connect said source of electrical power to said ignition circuit, a tab member supported on said cylinder for reciprocating radial movement into a retracted position and into an extended position by said key inserted into said key slot, connecting means movably mounted on said actuating means and being normally urged into a stop position on said actuating means adjacent said tab member in the starting position of said lock cylinder, said tab member being releasably engageable with said connecting means in said extended position and in the starting position of said cylinder for moving said connecting means in a radial direction outwardly from said cylinder to move said actuating means into said operative position for closing said starter motor circuit switch, said connecting means being movable on said actuating means by said extended tab member from said stop position during the rotary movement of said cylinder from said starting position to said inoperative position to maintain said actuating means in said operative position, said tab member being normally movable out of engagement with said connecting means and into said retracted position when said key is removed from said key slot to permit return movement of said connecting means to said stop position and corresponding movement of said actuating member into said inoperative position.

2. A key operated ignition switch in accordance with claim 1 including means on said support means for yieldingly urging said actuating means into said inoperative position and means on said actuating means for yieldingly urging said connecting means into said stop position.

3. A key operated ignition switch in accordance with claim 2 wherein said actuating means is of arcuate shape and is pivotally mounted on said support means for pivotal movement between said inoperative and said operative positions.

4. A key operated ignition switch in accordance with claim 3 wherein said connecting means includes a slide member slidably mounted on said actuating means and wherein said slide member and said tab member are provided with cam surfaces arranged to interengage in the starting position of said cylinder and in the extended position of said tab member for camming said actuating means into said operative position.

5. A key operated ignition switch in accordance with claim 4 wherein said actuating means comprises an arcuately shaped tubular member having a bore and wherein said slide member is arranged for sliding movement within said bore and wherein said urging means for said slide member include a coil spring disposed within said tubular member bore.

6. A key operated ignition switch in accordance with claim 5 wherein the wall of said tubular actuating member is provided with a longitudinally extending slot and including an extension on said slide member extending through said slot for sliding movement therein and being disposed between said actuating member and said lock cylinder, said extension having a cam surface and a shoulder sequentially engageable by said tab member for camming said actuating member into said operative position and for moving said slide member slidably on said actuating member respectively.

References Cited

UNITED STATES PATENTS

| | | | |
|---|---|---|---|
| 2,057,301 | 10/1936 | Golokow et al. | 200—44 X |
| 3,138,780 | 6/1964 | Jacobsen | 200—44 X |
| 3,317,904 | 5/1967 | Clay | 200—44 X |

ROBERT K. SCHAEFER, Primary Examiner

H. J. HOHAUSER, Assistant Examiner

U.S. Cl. X.R.

70—388